(12) United States Patent
Guo et al.

(10) Patent No.: US 10,467,192 B2
(45) Date of Patent: Nov. 5, 2019

(54) METHOD AND APPARATUS FOR UPDATING DATA TABLE IN KEYVALUE DATABASE

(71) Applicant: HUAWEI TECHNOLOGIES CO., LTD., Shenzhen, Guangdong (CN)

(72) Inventors: Yijun Guo, Shenzhen (CN); Jieshan Bi, Shenzhen (CN)

(73) Assignee: HAUWEI TECHNOLOGIES CO.,LTD., Shenzhen (CN)

(*) Notice: Subject to any disclaimer, the term of this patent is extended or adjusted under 35 U.S.C. 154(b) by 250 days.

(21) Appl. No.: 15/054,475

(22) Filed: Feb. 26, 2016

(65) Prior Publication Data

US 2016/0179836 A1    Jun. 23, 2016

Related U.S. Application Data

(63) Continuation of application No. PCT/CN2015/073211, filed on Feb. 17, 2015.

(30) Foreign Application Priority Data

Nov. 12, 2014    (WO) ................ PCT/CN2014/090934

(51) Int. Cl.
*G06F 16/16*    (2019.01)
*G06F 16/23*    (2019.01)
*G06F 16/22*    (2019.01)

(52) U.S. Cl.
CPC ........ *G06F 16/162* (2019.01); *G06F 16/2282* (2019.01); *G06F 16/23* (2019.01)

(58) Field of Classification Search
CPC ......... G06F 17/30117; G06F 17/30339; G06F 16/2282; G06F 16/23; Y10S 707/99942

USPC ........................................................ 707/610
See application file for complete search history.

(56) References Cited

U.S. PATENT DOCUMENTS

| 6,959,301 | B2 | 10/2005 | Rozenshtein et al. |
| 7,769,732 | B2 | 8/2010 | Cox et al. |
| 8,751,525 | B2* | 6/2014 | Kaufmann ............ G06F 16/219 707/769 |
| 9,317,545 | B2* | 4/2016 | Bailey ............... G06F 17/30309 |

(Continued)

FOREIGN PATENT DOCUMENTS

| CN | 101127915 A | 2/2008 |
| CN | 102279885 A | 12/2011 |

(Continued)

*Primary Examiner* — Marcin R Filipczyk
(74) *Attorney, Agent, or Firm* — Huawei Technologies Co., Ltd.

(57) ABSTRACT

A method for updating a data table in a KeyValue database is provided. Raw data is received and formatted into a data updating file. An update timestamp is set for each column qualifier in each row of the data updating file. A data deleting file is generated. A delete timestamp is set for each row of the data deleting file. Each row of the data deleting file corresponds to one row of old data in the data table. Each row of the data deleting file includes a row key that is the same as the row key of the corresponding row of old data in the data table. The data updating file and the data deleting file are both imported into the data table. Consequently, timestamp is used to indicate the valid data in the data table. An apparatus configured to perform the method is also provided.

14 Claims, 4 Drawing Sheets

(56) References Cited

U.S. PATENT DOCUMENTS

| | | | |
|---|---|---|---|
| 2003/0009436 A1 | 1/2003 | Broden et al. | |
| 2003/0115206 A1 | 6/2003 | Gilbert | |
| 2009/0083503 A1 | 3/2009 | Li et al. | |
| 2012/0284317 A1* | 11/2012 | Dalton | G06F 16/13 707/827 |
| 2014/0149355 A1 | 5/2014 | Gupta et al. | |
| 2015/0286671 A1 | 10/2015 | Ebiyama | |
| 2016/0026666 A1* | 1/2016 | Namiki | G06F 16/2272 707/744 |

FOREIGN PATENT DOCUMENTS

| | | |
|---|---|---|
| CN | 103002011 A | 3/2013 |
| CN | 103473239 A | 12/2013 |
| CN | 103595776 A | 2/2014 |
| CN | 103617232 A | 3/2014 |
| CN | 103714163 A | 4/2014 |
| JP | 2010128812 A | 6/2010 |
| WO | 2014068820 A1 | 5/2014 |

* cited by examiner

METHOD AND APPARATUS FOR UPDATING DATA TABLE IN KEYVALUE DATABASE

CROSS-REFERENCE TO RELATED APPLICATIONS

This application is a continuation of International Application No. PCT/CN2015/073211, filed on Feb. 17, 2015, which claims priority to International Patent Application No. PCT/CN2014/090934, filed on Nov. 12, 2014, both of which are hereby incorporated by reference in their entireties.

TECHNICAL FIELD

The present invention relates to the field of information technologies, and in particular, to a method for updating a data table of a KeyValue database and an apparatus for updating table data.

BACKGROUND

As a non-relational (NoSQL) database of distributed storage, a database of a key-value pair (KeyValue) type (which is hereinafter referred to as a KeyValue database) has high scalability and high reliability and has been widely applied in more systems. Data in many KeyValue databases is stored in units of table. Each table includes multiple rows of data; each row of data is uniquely identified by using a row key (RowKey), and each row of data includes multiple column qualifiers; and each column qualifier is corresponding to a piece of KeyValue data, and each column qualifier has a data type and a timestamp. The data type includes Put (newly-added), Delete (delete), and the like. A Put type is used to indicate that a qualifier is a newly-added qualifier, and a Delete type is used to indicate that a qualifier is used to delete an old qualifier. The timestamp is used to indicate generating time of each qualifier. In a KeyValue database, multi-version storage of data is implemented by using a timestamp, that is, for data with a same RowKey value, new data and old data are differentiated by using a timestamp. When the KeyValue database includes multiple versions of data, an old version of data is overwritten by a new version of data, and when reading data, a user directly reads the new version of data.

A mark-as-delete technique is used for updating data in the KeyValue database, and KeyValue data is deleted or imported piece by piece. In an actual application, full updating often needs to be performed on all data of table data, that is, all existing data in a table needs to be cleared and new data is imported into the table. However, an existing KeyValue database does not support one-time full updating. If table data is deleted and imported piece by piece, a process of updating all data in a table takes a long time, and the updating process lacks atomicity, which affects quality of a data reading service provided by the table. Therefore, it is of great significance to provide a table data full updating method applicable to the KeyValue database.

SUMMARY

Embodiments of the present invention provide a method for updating a data table of a KeyValue database, which can implement full updating of table data in a KeyValue database. The method includes receiving a full data updating instruction, acquiring to-be-imported data according to the full data updating instruction, generating a full data updating file according to the to-be-imported data. The full data updating file includes P rows of new data, each row of new data includes one row key and Q new column qualifiers, and an update timestamp is set for each new column qualifier; wherein P is greater than or equal to 1, and Q is equal to or greater than 1. The method further includes acquiring M rows of old data in a data table corresponding to the full data updating instruction. Each row of old data includes one row key and N old column qualifiers, and an original timestamp is set for each old column qualifier. The method further includes generating a full data deleting file according to the M rows of old data. The full data deleting file includes M rows of delete data, each row of delete data is in a one-to-one correspondence with each row of old data. A delete timestamp is set for each row of delete data; a delete timestamp of an $R^{th}$ row of delete data is greater than a maximum value of an original timestamp of the $R^{th}$ row of old data; the delete timestamp of the $R^{th}$ row of delete data is less than a minimum value of an update timestamp of an $S^{th}$ row of new data; and the $R^{th}$ row of delete data, the $R^{th}$ row of old data, and the $S^{th}$ row of new data have a same RowKey, $1 \leq R \leq M$, and $1 \leq S \leq P$. import the full data updating file into the data table. import the full data deleting file into the data table.

Embodiments of the present invention also provide an apparatus. The apparatus includes a processor and a memory storing instructions for execution by the processor. The instructions, when executed by the processor, cause the apparatus to perform the following operations:

receiving a full data updating instruction;

acquiring to-be-imported data according to the full data updating instruction, and generate a full data updating file according to the to-be-imported data, where the full data updating file includes P rows of new data, each row of new data includes one row key and Q new column qualifiers, a data type of each new column qualifier is a put type, and an update timestamp is set for each new column qualifier;

acquiring M rows of old data in a data table corresponding to the full data updating instruction, where each row of old data includes one row key and N old column qualifiers, and an original timestamp is set for each old column qualifier;

generating a full data deleting file according to the M rows of old data, where the full data deleting file includes M rows of delete data; each row of delete data is in a one-to-one correspondence with each row of old data; a data type of each row of delete data is a Delete type; a delete timestamp is set for each row of delete data; a delete timestamp of an $R^{th}$ row of delete data is greater than a maximum value of an original timestamp of the $R^{th}$ row of old data; the delete timestamp of the $R^{th}$ row of delete data is less than a minimum value of an update timestamp of an $S^{th}$ row of new data; and the $R^{th}$ row of delete data, the $R^{th}$ row of old data, and the $S^{th}$ row of new data have a same RowKey, $1 \leq R \leq M$, and $1 \leq S \leq P$; and importing the full data updating file into the data table and importing the full data deleting file into the data table.

By using such the above method or the above apparatus, full updating of all data in a data table of a KeyValue database is implemented. In addition, because a full data updating file and a full data deleting file are not imported into the KeyValue database piece by piece, compared with updating KeyValue data in a data table piece by piece in the prior art, according to the method provided in the embodiments of the present invention, an updating speed is faster and atomicity is better.

Embodiments of the present invention also provide an apparatus. The apparatus includes a processor and a memory storing instructions for execution by the processor. The instructions, when executed by the processor, cause the apparatus to perform the following operations:

receiving a full data updating instruction;

acquiring to-be-imported data according to the full data updating instruction, and generate a full data updating file according to the to-be-imported data, where the full data updating file includes P rows of new data, each row of new data includes one row key and Q new column qualifiers, a data type of each new column qualifier is a put type, and an update timestamp is set for each new column qualifier;

acquiring M rows of old data in a data table corresponding to the full data updating instruction, where each row of old data includes one row key and N old column qualifiers, and an original timestamp is set for each old column qualifier;

generating a full data deleting file according to the M rows of old data, where the full data deleting file includes M rows of delete data; each row of delete data is in a one-to-one correspondence with each row of old data; a data type of each row of delete data is a Delete type; a delete timestamp is set for each row of delete data; a delete timestamp of an $R^{th}$ row of delete data is greater than a maximum value of an original timestamp of the $R^{th}$ row of old data; the delete timestamp of the $R^{th}$ row of delete data is less than a minimum value of an update timestamp of an $S^{th}$ row of new data; and the $R^{th}$ row of delete data, the $R^{th}$ row of old data, and the $S^{th}$ row of new data have a same RowKey, $1 \leq R \leq M$, and $1 \leq S \leq P$; and importing the full data updating file into the data table and importing the full data deleting file into the data table.

By using such the above method or the above apparatus, full updating of all data in a data table of a KeyValue database is implemented. In addition, because a full data updating file and a full data deleting file are not imported into the KeyValue database piece by piece, compared with updating KeyValue data in a data table piece by piece in the prior art, according to the method provided in the embodiments of the present invention, an updating speed is faster and atomicity is better.

DESCRIPTION OF EMBODIMENTS

Embodiments of the present invention provide a method for updating a data table of a KeyValue database, which can implement full updating of table data in a KeyValue database. The present invention further provides a related apparatus for updating table data. The following separately describes the method and the apparatus.

Figure 1:
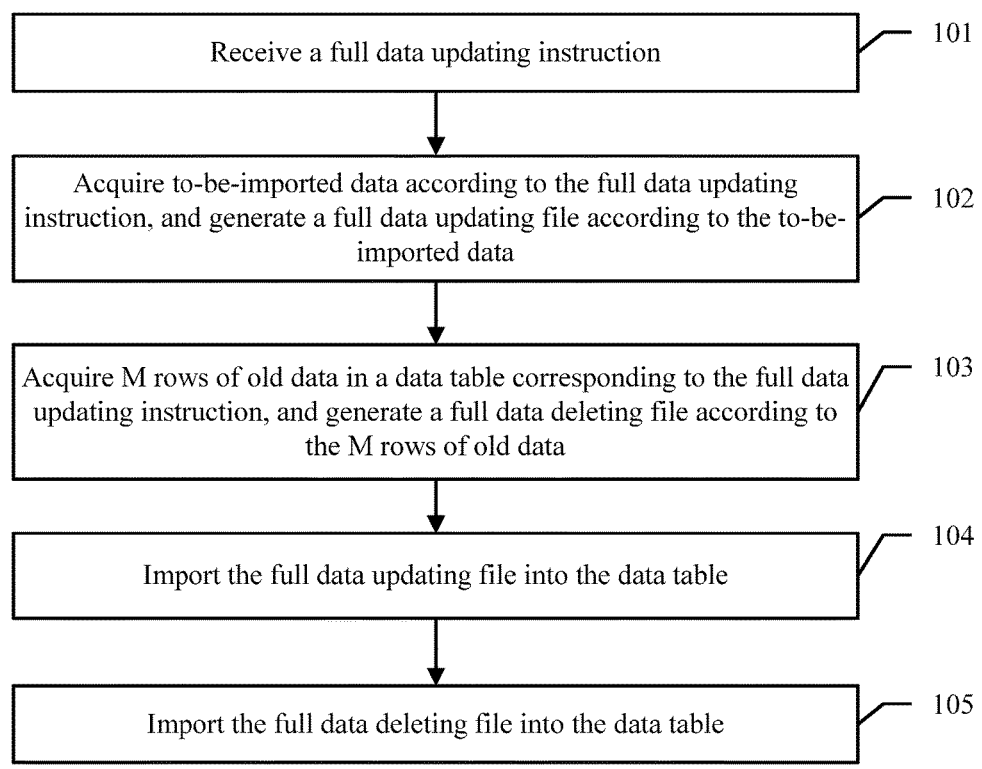
FIG. 1 is a flowchart of a method for updating a data table of a KeyValue database according to an embodiment of the present invention.

Referring to FIG. 1, a basic process of a method for updating a data table of a KeyValue database provided in an embodiment of the present invention mainly includes:

101. Receive a full data updating instruction.

A user delivers the full data updating instruction by using a client, where the full data updating instruction is used for instructing to fully update table data of a specified data table in a KeyValue database. An apparatus for updating table data receives the full data updating instruction.

102. Acquire to-be-imported data according to the full data updating instruction, and generate a full data updating file according to the to-be-imported data.

The apparatus for updating table data acquires the to-be-imported data according to the full data updating instruction, and generates the full data updating file according to the to-be-imported data. Preferably, the full data updating instruction may include a table name of the data table, and specifies a save path of the to-be-imported data and a save path of the generated full data updating file. The apparatus for updating table data acquires the to-be-imported data from the save path that is of the to-be-imported data and specified in the full data updating instruction, generates the full data updating file according to the to-be-imported data, and then saves the full data updating file to the save path that is of the full data updating file and specified in the full data updating instruction.

The full data updating file includes P rows of new data, where each row of new data includes one row key and Q new column qualifiers, a data type of each new column qualifier is a put type, and an update timestamp is set for each new column qualifier.

103. Acquire M rows of old data in a data table corresponding to the full data updating instruction, and generate a full data deleting file according to the M rows of old data.

The apparatus for updating table data acquires the M rows of old data in the data table corresponding to the full data updating instruction, where each row of old data includes one row key and N old column qualifiers, and an original timestamp is set for each old column qualifier. The apparatus for updating table data generates the full data deleting file according to the M rows of old data.

Preferably, the full data updating instruction may include a table name of the data table, and specifies a save path of the generated full data deleting file. The apparatus for updating table data determines the data table according to the table name of the data table, and then saves the data table to the save path that is of the full data deleting file and specified in the full data updating instruction.

The full data deleting file includes M rows of delete data, where each row of delete data is in a one-to-one correspondence with each row of old data in the data table, a data type of each row of delete data is a Delete type, and each row of delete data is used to delete old data that has a same RowKey as the row of delete data. A delete timestamp is set for each row of delete data.

Step 103 may also be performed before step 102, which is not limited in this embodiment. However, irrespective of a sequence between step 103 and step 102, it needs to be ensured that a delete timestamp of an $R^{th}$ row of delete data is greater than a maximum value of an original timestamp of the $R^{th}$ row of old data, and the delete timestamp of the $R^{th}$ row of delete data is less than a minimum value of an update timestamp of an $S^{th}$ row of new data. The $R^{th}$ row of delete data, the $R^{th}$ row of old data, and the $S^{th}$ row of new data have a same RowKey, $1 \leq R \leq M$, and $1 \leq S \leq P$.

104. Import the full data updating file into the data table.

The apparatus for updating table data imports the full data updating file into the data table corresponding to the full data updating instruction, where the full data updating file is imported into the data table at a time, which can ensure atomicity of data importing.

The minimum value of the update timestamp of the $S^{th}$ row of new data in the full data updating file is greater than the maximum value of the original timestamp of the $R^{th}$ row of old data that has the same RowKey as the $S^{th}$ row of new data, and therefore, after the full data updating file is imported into the data table, if the $R^{th}$ row of old data exists, the $S^{th}$ row of new data can overwrite the $R^{th}$ row of old data, and the user can read the $S^{th}$ row of new data, but cannot read the $R^{th}$ row of old data.

105. Import the full data deleting file into the data table.

The apparatus for updating table data imports the full data deleting file into the data table corresponding to the full data updating instruction, where the full data deleting file is imported into the data table at a time, which can ensure atomicity of data deletion.

The delete timestamp of the $R^{th}$ row of delete data is greater than the maximum value of the original timestamp of the $R^{th}$ row of old data that has the same RowKey as the $R^{th}$ row of delete data, and therefore, the $R^{th}$ row of delete data can delete the $R^{th}$ row of old data that has the same RowKey as the $R^{th}$ row of delete data. In addition, the full data deleting file includes the M rows of delete data that are in a one-to-one correspondence with RowKeys of the M rows of old data in the data table, and therefore, after the full data deleting file is imported into the data table, all the M rows of old data in the data table are deleted, and the user cannot read the old data from the data table. The delete timestamp of the $R^{th}$ row of delete data is less than the minimum value of the update timestamp of the $S^{th}$ row of new data that has the same RowKey as the $R^{th}$ row of delete data, and therefore, if the $S^{th}$ row of new data exists, the $S^{th}$ row of new data is still valid, that is, after the full data deleting file is imported into the data table, the full data updating file can still be normally read by the user.

Step 105 may also be performed step 104, which is not limited in this embodiment.

This embodiment provides the method for updating a data table of a KeyValue database, including: receiving a full data updating instruction; acquiring to-be-imported data according to the full data updating instruction, and generating a full data updating file according to the to-be-imported data; acquiring M rows of old data in a data table corresponding to the full data updating instruction; generating a full data deleting file according to the M rows of old data; importing the full data updating file into the data table; and importing the full data deleting file into the data table. By using such a method, full updating of all data in a data table of a KeyValue database is implemented. In addition, because a full data updating file and a full data deleting file are not imported into the KeyValue database piece by piece, compared with updating KeyValue data in a data table piece by piece in the prior art, according to the method provided in this embodiment, an updating speed is faster and atomicity is better.

Figure 2:
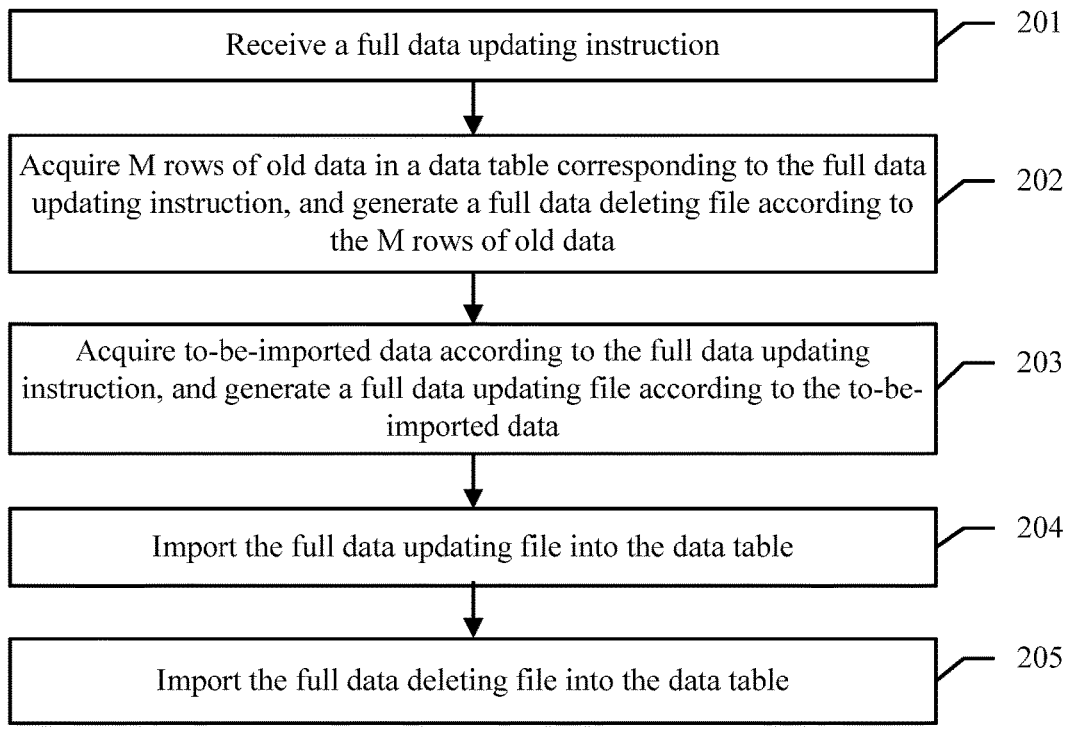
FIG. 2 is a flowchart of a method for updating a data table of a KeyValue database according to another embodiment of the present invention.

In the embodiment shown in FIG. 1, a sequence between steps 102 and 103 is not limited, and a sequence between steps 104 and 105 is not limited. However, in an actual application, by changing the sequence of these steps, a beneficial effect can be further brought. Referring to FIG. 2, a process of another method for updating a data table of a KeyValue database provided in an embodiment of the present invention includes:

201. Receive a full data updating instruction.

A user delivers the full data updating instruction by using a client, where the full data updating instruction is used for instructing to fully update table data of a data table in a KeyValue database. An apparatus for updating table data receives the full data updating instruction.

Specifically, the full data updating instruction is used for instructing to delete old data of the data table in the KeyValue database and import new data into the data table, and therefore, preferably, the full data updating instruction may include a deleting instruction and an updating instruction. The deleting instruction is used for instructing to delete the old data of the data table in the KeyValue database, and the updating instruction is used for instructing to import the new data into the data table.

202. Acquire M rows of old data in a data table corresponding to the full data updating instruction, and generate a full data deleting file according to the M rows of old data.

The apparatus for updating table data acquires, according to the full data updating instruction, the M rows of old data in the data table corresponding to the full data updating instruction, where each row of old data includes one row key and N old column qualifiers, and an original timestamp is set for each old column qualifier. The apparatus for updating table data generates the full data deleting file according to the M rows of old data.

Preferably, the full data updating instruction may include a table name of the data table, and specifies a save path of the generated full data deleting file. The apparatus for updating table data determines the data table according to the table name of the data table, and then saves the data table to the save path that is of the full data deleting file and specified in the full data updating instruction.

The full data deleting file includes M rows of delete data, where each row of delete data is in a one-to-one correspondence with each row of old data in the data table, a data type of each row of delete data is a Delete type, and each row of delete data is used to delete old data that has a same RowKey as the row of delete data. A delete timestamp is set for each row of delete data, and a moment of the delete timestamp of each row of delete data is a moment at which the full data deleting file is generated, where the timestamp is greater than a maximum value of the original timestamp.

If the full data updating instruction includes the deleting instruction and the updating instruction, the apparatus for updating table data performs an operation in this step according to the deleting instruction.

203. Acquire to-be-imported data according to the full data updating instruction, and generate a full data updating file according to the to-be-imported data.

After generating the full data deleting file, the apparatus for updating table data acquires the to-be-imported data according to the full data updating instruction, and generates the full data updating file according to the to-be-imported data. Preferably, the full data updating instruction may include the table name of the data table, and specifies a save path of the to-be-imported data and a save path of the generated full data updating file. The apparatus for updating table data acquires the to-be-imported data from the save path that is of the to-be-imported data and specified in the full data updating instruction, generates the full data updating file according to the to-be-imported data, and then saves the full data updating file to the save path that is of the full data updating file and specified in the full data updating instruction.

The full data updating file includes P rows of new data, where each row of new data includes one row key and Q new column qualifiers, a data type of each new column qualifier is a put type, and an update timestamp is set for each new column qualifier; in addition, a moment of the update timestamp of each new column qualifier is a moment at which the full data updating file is generated, and the update timestamp is greater than the maximum value of the original timestamp.

If the full data updating instruction includes the deleting instruction and the updating instruction, the apparatus for updating table data performs an operation in this step according to the updating instruction.

204. Import the full data updating file into the data table.

The apparatus for updating table data imports the full data updating file into the data table corresponding to the full data updating instruction, where the full data updating file is imported into the data table at a time, which can ensure atomicity of data importing.

Preferably, the apparatus for updating table data may change the save path of the full data updating file to a directory of the data table, so as to implement importing of the full data updating file into the data table. Time consumption of an operation of changing the save path is only second level.

The moment of the update timestamp of each new column qualifier is the moment at which the full data updating file is generated, and the update timestamp is greater than the maximum value of the original timestamp; therefore, after the full data updating file is imported into the data table, an $S^{th}$ row of new data can overwrite an $R^{th}$ row of old data, the user can read the $S^{th}$ row of new data, but cannot read the $R^{th}$ row of old data. The $R^{th}$ row of old data and the $S^{th}$ row of new data have a same RowKey, $1 \leq R \leq M$, and $1 \leq S \leq P$.

205. Import the full data deleting file into the data table.

The apparatus for updating table data imports the full data deleting file into the data table corresponding to the full data updating instruction, where the full data deleting file is imported into the data table at a time, which can ensure atomicity of data deletion.

Preferably, the apparatus for updating table data may change the save path of the full data deleting file to the directory of the data table, so as to implement importing of the full data deleting file into the data table. An operation of changing the save path takes only seconds.

The moment of the delete timestamp of each row of delete data is the moment at which the full data deleting file is generated, and the timestamp is greater than the maximum value of the original timestamp; therefore, after the full data updating file is imported into the data table, the $R^{th}$ row of delete data can delete the $R^{th}$ row of old data that has the same RowKey as the $R^{th}$ row of delete data. In addition, the full data deleting file includes the M rows of delete data that are in a one-to-one correspondence with RowKeys of the M rows of old data in the data table, and therefore, after the full data deleting file is imported into the data table, all the M rows of old data in the data table are deleted, and the user cannot read the old data from the data table. The moment of the update timestamp of each new column qualifier is the moment at which the full data updating file is generated in step 203, the moment of the delete timestamp of each row of delete data is the moment at which the full data deleting file is generated in step 202, and step 202 is performed before step 203; therefore, each delete timestamp is less than each update timestamp, the full data deleting file does not delete data in the full data updating file, and the full data updating file can still be normally read by the user.

A sequence between steps 204 and 205 is not limited in this embodiment.

However, if step 205 is first performed, after the full data deleting file is imported into the data table and before the full data updating file is imported into the data table, no data in the data table can be read by the user, and a service provided by the KeyValue database for the user is temporarily in an interrupted state. Therefore, preferably, step 204 is first performed, and then step 205 is performed; in this way, it can be ensured that when the data table of the KeyValue database is being updated, the user can always read data in the data table, and the service is not interrupted.

Preferably, the KeyValue database in this embodiment of the present invention may use a distributed file system as a medium of underlying data storage. The distributed file system is a file management system, and a physical storage resource in the system is not necessarily connected to a local node, but is connected to multiple nodes by using a computer network. In the distributed file system, a large data block is divided into multiple small data blocks, and the multiple small data blocks are stored on multiple nodes, so that the distributed file system has high fault tolerance and a high throughput. There are many common distributed file systems, including a Hadoop Distributed File System (HDFS) and the like; the distributed file system is not limited in this embodiment of the present invention, and the HDFS is only used as an example. After generating the full data updating file and the full data deleting file, the apparatus for updating table data saves the full data updating file and the full data deleting file to a location other than a directory of a KeyValue database in the HDFS. In step 204, the save path of the full data updating file is changed to a directory of a data table in the KeyValue database in the HDFS, and in step 205, the save path of the full data deleting file is changed to the directory of the data table in the KeyValue database in the HDFS.

This embodiment provides the method for updating a data table of a KeyValue database, including: receiving a full data updating instruction; acquiring the to-be-imported data according to the full data updating instruction and generating a full data updating file according to to-be-imported data; acquiring M rows of old data in a data table corresponding to the full data updating instruction, and generating a full data deleting file according to the M rows of old data; importing the full data updating file into the data table; and importing the full data deleting file into the data table. By using such a method, updating of all data in a data table of a KeyValue database is implemented. In addition, because a full data updating file and a full data deleting file are not imported into the KeyValue database piece by piece, and importing takes only seconds, compared with updating KeyValue data in a data table piece by piece in the prior art, according to the method provided in this embodiment of the present invention, atomicity is better and an updating speed is faster. Moreover, according to the method in this embodiment of the present invention, the full data updating file is imported first, and then the full data deleting file is imported; therefore a case in which old data has already been deleted while no new data has been imported into a target table does not occur. Therefore, a data reading service is not interrupted, and user experience is better.

For ease of understanding the foregoing embodiment, the following uses a specific application scenario of the foregoing embodiment as an example for description.

A KeyValue database uses an HDFS as a medium of underlying data storage. A user delivers a full data updating instruction by using a client, to instruct to update data in a data table Table1.

A form of the data table Table1 is shown in Table1. Table1 shows only a logic structure of the data table Table1, where an underlying file of the data table Table1 is in a KeyValue form, each qualifier of each row is corresponding to one KeyValue, and each KeyValue includes a RowKey value, a data type, and an original timestamp, and may further include other information. The data table Table1 includes 100 rows of old data; and in the 100 rows of old data, each row of old data includes one RowKey and three column qualifiers (a qualifier 1, a qualifier 2, and a qualifier 3), and an original timestamp T0 is set for each column qualifier. A data type of each column qualifier is Put.

TABLE 1

| | Qualifier 1 | | Qualifier 2 | | Qualifier 3 | |
|---|---|---|---|---|---|---|
| RowKey | Data type | Original timestamp | Data type | Original timestamp | Data type | Original timestamp |
| 1 | Put | T0 | Put | T0 | Put | T0 |
| 2 | Put | T0 | Put | T0 | Put | T0 |
| 3 | Put | T0 | Put | T0 | Put | T0 |
| ... | ... | ... | ... | ... | ... | ... |
| 99 | Put | T0 | Put | T0 | Put | T0 |
| 100 | Put | T0 | Put | T0 | Put | T0 |

At a moment T1, the apparatus for updating table data acquires the 100 rows of old data in Table1 according to the full data updating instruction. The apparatus for updating table data generates a full data deleting file according to the 100 rows of old data. The full data deleting file includes 100 rows of delete data that are in a one-to-one correspondence with the 100 rows of old data in the data table Table1, where the 100 rows of delete data are in a one-to-one correspondence with RowKeys of the 100 rows of old data, and the 100 rows of delete data are used to delete the 100 rows of old data.

A form of the 100 rows of delete data of the full data deleting file may be shown in Table 2(a). Table 2(a) shows only a logic structure of the full data deleting file, where an underlying file of the full data deleting file is in a KeyValue form, each row is corresponding to one KeyValue, and each KeyValue includes a RowKey value, a data type, and a delete timestamp, and may further include other information. A data type of each row of delete data is Delete, and a delete timestamp is set for each row of delete data; and a moment of the delete timestamp of each row of delete data is the moment T1 at which the full data deleting file is generated, where T1 is greater than T0.

TABLE 2(a)

| RowKey | Data Type | Delete Timestamp |
|---|---|---|
| 1 | Delete | T1 |
| 2 | Delete | T1 |
| 3 | Delete | T1 |
| ... | ... | ... |
| 99 | Delete | T1 |
| 100 | Delete | T1 |

Particularly, the form of the 100 rows of delete data of the full data deleting file may also be shown in Table 2(b). Table 2(b) shows only a logic structure of the full data deleting file, where an underlying file of the full data deleting file is in a KeyValue form, each qualifier of each row is corresponding to one KeyValue, and each KeyValue includes a RowKey value, a data type, and a delete timestamp, and may further include other information. Each row of delete data has three qualifiers in Table1, a data type of each qualifier is Delete, and a delete timestamp is set for each qualifier; and a moment of the delete timestamp of each qualifier is the moment T1 at which the full data deleting file is generated, where T1 is greater than T0. In this example, only the full data deleting file shown in FIG. 2(a) is used as an example for description.

TABLE 2(b)

| | Qualifier 1 | | Qualifier 2 | | Qualifier 3 | |
|---|---|---|---|---|---|---|
| RowKey | Data type | Delete timestamp | Data type | Delete timestamp | Data type | Delete timestamp |
| 1 | Delete | T1 | Delete | T1 | Delete | T1 |
| 2 | Delete | T1 | Delete | T1 | Delete | T1 |
| 3 | Delete | T1 | Delete | T1 | Delete | T1 |
| ... | ... | ... | ... | ... | ... | ... |
| 99 | Delete | T1 | Delete | T1 | Delete | T1 |
| 100 | Delete | T1 | Delete | T1 | Delete | T1 |

At a moment T2, the apparatus for updating table data acquires to-be-imported data according to the full data updating instruction, and generates a full data updating file according to the to-be-imported data. Referring to Table 3, Table 3 shows only a logic structure of the full data updating file, where an underlying file of the full data updating file is in a KeyValue form, each qualifier of each row is corresponding to one KeyValue, and each KeyValue includes a RowKey value, a data type, and an update timestamp, and may further include other information. The full data updating file includes 200 rows of new data, and each row of new data includes one row key and three new column qualifiers (a qualifier 1, a qualifier 2, and a qualifier 4), where a data type of each new column qualifier is a put type, and an update timestamp is set for each new column qualifier; and a moment of the update timestamp of each new column qualifier is the moment T2 at which the full data updating file is generated, where T2 is greater than T1.

TABLE 3

| | Qualifier 1 | | Qualifier 2 | | Qualifier 4 | |
|---|---|---|---|---|---|---|
| RowKey | Data type | Update timestamp | Data type | Update timestamp | Data type | Update timestamp |
| 51 | Put | T2 | Put | T2 | Put | T2 |
| 52 | Put | T2 | Put | T2 | Put | T2 |
| 53 | Put | T2 | Put | T2 | Put | T2 |
| ... | ... | ... | ... | ... | ... | ... |
| 249 | Put | T2 | Put | T2 | Put | T2 |
| 250 | Put | T2 | Put | T2 | Put | T2 |

At a moment T3, the apparatus for updating table data changes a save path of the full data updating file to a directory of the data table Table1, so as to implement importing of the full data updating file into the data table.

At a moment T4, the apparatus for updating table data changes a save path of the full data deleting file to the directory of the data table Table1, so as to implement importing of the full data deleting file into the data table. In this way, data of the full data updating file is valid, but all the old data in the data table is deleted. T4 is greater than T3.

Figure 3:
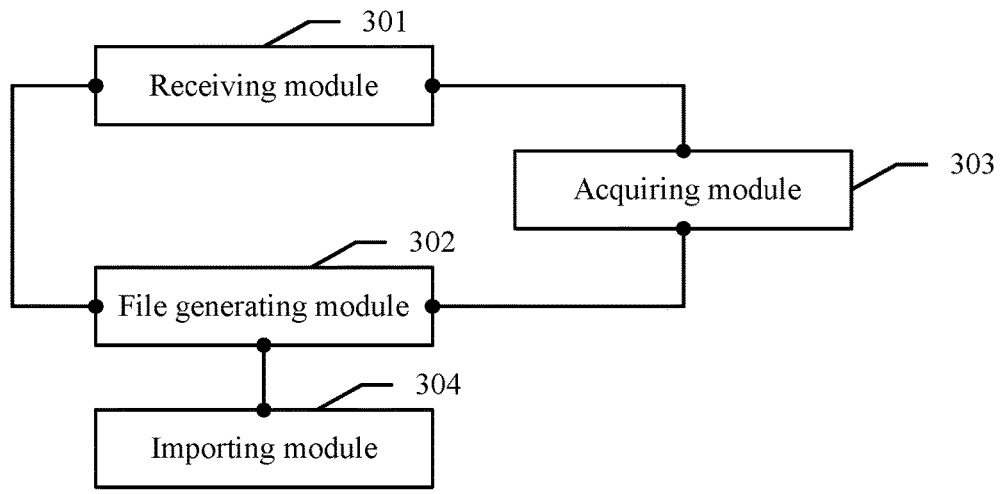
FIG. 3 is a structural diagram of an apparatus for updating table data according to an embodiment of the present invention.

An embodiment of the present invention further provides a related apparatus for updating table data. Referring to FIG. 3, a basic structure of the apparatus mainly includes:

A receiving module 301 is configured to receive a full data updating instruction.

A user delivers the full data updating instruction by using a client, where the full data updating instruction is used for instructing to fully update table data of a data table in a KeyValue database. The receiving module 301 receives the full data updating instruction.

A file generating module 302 is configured to: acquire to-be-imported data according to the full data updating instruction, and generate a full data updating file according to the to-be-imported data.

The file generating module 302 acquires the to-be-imported data according to the full data updating instruction, and generates the full data updating file according to the to-be-imported data. Preferably, the full data updating instruction may include a table name of the data table, and specifies a save path of the to-be-imported data and a save path of the generated full data updating file. The file generating module 302 acquires the to-be-imported data from the save path that is of the to-be-imported data and specified in the full data updating instruction, generates the full data updating file according to the to-be-imported data, and then saves the full data updating file to the save path that is of the full data updating file and specified in the full data updating instruction.

The full data updating file includes P rows of new data, where each row of new data includes one row key and Q new column qualifiers, a data type of each new column qualifier is a put type, and an update timestamp is set for each new column qualifier.

An acquiring module 303 is configured to acquire M rows of old data in a data table corresponding to the full data updating instruction.

Each row of old data includes one RowKey and N old column qualifiers, and an original timestamp is set for each column qualifier.

The file generating module 302 is further configured to generate a full data deleting file according to the M rows of old data.

Preferably, the full data updating instruction may include a table name of the data table, and specifies a save path of the generated full data deleting file. The file generating module 302 determines the data table according to the table name of the data table, and then saves the data table to the save path that is of the full data deleting file and specified in the full data updating instruction.

The full data deleting file includes M rows of delete data, where each row of delete data is in a one-to-one correspondence with each row of old data in the data table, a data type of each row of delete data is a Delete type, and each row of delete data is used to delete old data that has a same RowKey as the row of delete data. A delete timestamp is set for each row of delete data.

A delete timestamp of an $R^{th}$ row of delete data is greater than a maximum value of an original timestamp of the $R^{th}$ row of old data, and the delete timestamp of the $R^{th}$ row of delete data is less than a minimum value of an update timestamp of an $S^{th}$ row of new data. The $R^{th}$ row of delete data, the $R^{th}$ row of old data, and the $S^{th}$ row of new data have a same RowKey, $1 \le R \le M$, and $1 \le S \le P$.

An importing module 304 is configured to import the full data updating file into the data table and import the full data deleting file into the data table.

The importing module 304 imports the full data updating file into the data table corresponding to the full data updating instruction, where the full data updating file is imported into the data table at a time, which can ensure atomicity of data importing.

The minimum value of the update timestamp of the $S^{th}$ row of new data in the full data updating file is greater than the maximum value of the original timestamp of the $R^{th}$ row of old data that has the same RowKey as the $S^{th}$ row of new data, and therefore, after the full data updating file is imported into the data table, if the $R^{th}$ row of old data exists, the $S^{th}$ row of new data can overwrite the $R^{th}$ row of old data, and the user can read the $S^{th}$ row of new data, but cannot read the $R^{th}$ row of old data.

The importing module 304 imports the full data deleting file into the data table corresponding to the full data updating instruction, where the full data deleting file is imported into the data table at a time, which can ensure atomicity of data deletion.

The delete timestamp of the $R^{th}$ row of delete data is greater than the maximum value of the original timestamp of the $R^{th}$ row of old data that has the same RowKey as the $R^{th}$ row of delete data, and therefore, the $R^{th}$ row of delete data can delete the $R^{th}$ row of old data that has the same RowKey as the $R^{th}$ row of delete data. In addition, the full data deleting file includes the M rows of delete data that are in a one-to-one correspondence with RowKeys of the M rows of old data in the data table, and therefore, after the full data deleting file is imported into the data table, all the M rows of old data in the data table are deleted, and the user cannot read the old data from the data table. The delete timestamp of the $R^{th}$ row of delete data is less than the minimum value of the update timestamp of the $S^{th}$ row of new data that has the same RowKey as the $R^{th}$ row of delete data, and therefore, if the $S^{th}$ row of new data exists, the $S^{th}$ row of new data is still valid, that is, after the full data deleting file is imported into the data table, the full data updating file can still be normally read by the user.

This embodiment provides the apparatus for updating table data, including: a receiving module 301, configured to receive a full data updating instruction; a file generating module 302, configured to: acquire to-be-imported data according to the full data updating instruction, and generate a full data updating file according to the to-be-imported data; an acquiring module 303, configured to acquire M rows of old data in a data table corresponding to the full data updating instruction; where the file generating module 302 is further configured to generate a full data deleting file according to the M rows of old data; and an importing module 304, configured to import the full data updating file into the data table and import the full data deleting file into the data table. The apparatus for updating table data provided in this embodiment can implement updating of all data in a data table of a KeyValue database. In addition, because a full data updating file and a full data deleting file are not imported into the KeyValue database piece by piece, compared with updating KeyValue data in a data table piece by piece in the prior art, according to the apparatus for updating table data provided in this embodiment of the present invention, an updating speed is faster and atomicity is better.

Preferably, in the embodiment shown in FIG. 3, the file generating module 302 may first generate the full data deleting file, and then generate the full data updating file. In this way, it can be ensured that when the data table of the KeyValue database is being updated, the user can always read data in the data table, and a service is not interrupted. More preferably, the file generating module 302 may set a moment at which the full data updating file is generated as the update timestamp of each new column qualifier, and set a moment at which the full data deleting file is generated as the delete timestamp of each row of delete data. Preferably, in the embodiment shown in FIG. 3, the importing module 304 may first import the full data updating file into the data table, and then import the full data deleting file into the data table.

Preferably, in the embodiment shown in FIG. 3, the importing module 304 is specifically configured to change the save path of the full data updating file to a directory of the data table, and change the save path of the full data deleting file to the directory of the data table. An operation of changing the save path takes only seconds. More preferably, the KeyValue database in this embodiment of the present invention may use a distributed file system as a medium of underlying data storage, and the importing module 304 is specifically configured to change the save path of the full data updating file to a directory of a data table of a KeyValue database in an HDFS, and change the save path of the full data deleting file to the directory of the data table of the KeyValue database in the HDFS.

For ease of understanding the foregoing embodiment, the following uses a specific application scenario of the foregoing embodiment as an example for description.

A KeyValue database uses an HDFS as a medium of underlying data storage. A user delivers a full data updating instruction by using a client, to instruct to update data in a data table Table1.

A form of the data table Table1 is shown in Table 1. The data table Table1 includes 100 rows of old data; and in the 100 rows of old data, each row of old data includes one RowKey and three column qualifiers (a qualifier 1, a qualifier 2, and a qualifier 3), and an original timestamp T0 is set for each column qualifier. A data type of each column qualifier is Put.

At a moment T1, the receiving module 301 acquires the 100 rows of old data in the data table Table1 according to the full data updating instruction. The file generating module 302 generates a full data deleting file according to the 100 rows of old data. The full data deleting file includes 100 rows of delete data that are in a one-to-one correspondence with the 100 rows of old data in the data table Table1, where the 100 rows of delete data are in a one-to-one correspondence with RowKeys of the 100 rows of old data, and the 100 rows of delete data are used to delete the 100 rows of old data.

A form of the 100 rows of delete data of the full data deleting file may be shown in Table 2(a). A data type of each row of delete data is Delete, and a delete timestamp is set for each row of delete data; and a moment of the delete timestamp of each row of delete data is the moment T1 at which the full data deleting file is generated, where T1 is greater than T0.

Referring to Table 3, at a moment T2, the file generating module 302 acquires to-be-imported data according to the full data updating instruction, and generates a full data updating file according to the to-be-imported data. The full data updating file includes 200 rows of new data, and each row of new data includes one row key and three new column qualifiers (a qualifier 1, a qualifier 2, and a qualifier 4), where a data type of each new column qualifier is a put type, and an update timestamp is set for each new column qualifier; and a moment of the update timestamp of each new column qualifier is the moment T2 at which the full data updating file is generated, where T2 is greater than T1.

At a moment T3, the importing module 304 changes a save path of the full data updating file to a directory of the data table, so as to implement importing of the full data updating file into the data table.

At a moment T4, the importing module 304 changes a save path of the full data deleting file into the directory of the data table, so as to implement importing of the full data deleting file into the data table. In this way, data of the full data updating file is valid, but all the old data in the data table is deleted. T4 is greater than T3.

Figure 4:
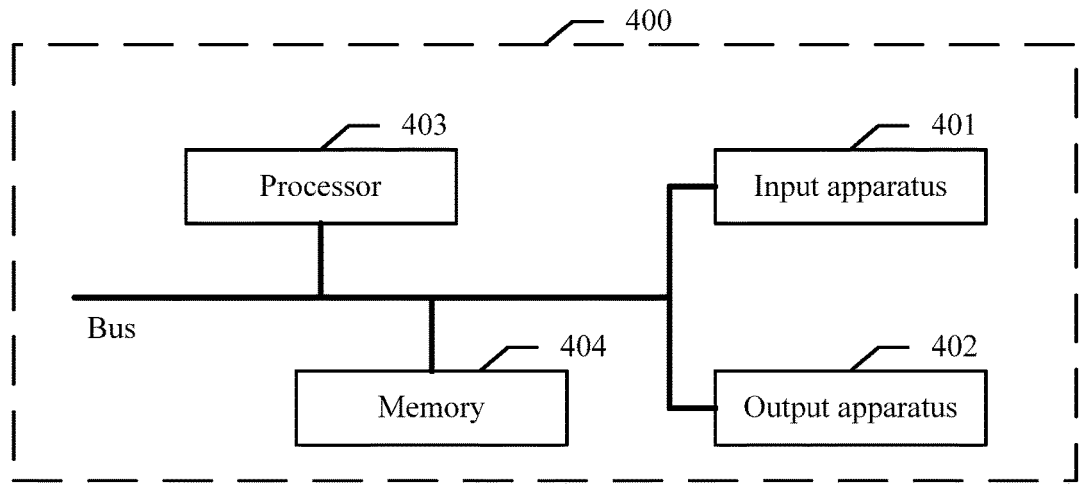
FIG. 4 is a structural diagram of an apparatus for updating table data according to another embodiment of the present invention.

The foregoing describes an apparatus for updating table data in the embodiments of the present invention from a perspective of unitization of a functional entity; and the following describes the apparatus for updating table data in the embodiments of the present invention from a perspective of hardware processing. Referring to FIG. 4, another embodiment of an apparatus 400 for updating table data in the embodiments of the present invention includes:

an input apparatus 401, an output apparatus 402, a processor 403, and a memory 404 (there may be one or more processors 403 in the apparatus 400 for updating table data, and that there is one processor 403 is used as an example in FIG. 4). In some embodiments of the present invention, the input apparatus 401, the output apparatus 402, the processor 403, and the memory 404 may be connected by using a bus or in another manner. That a bus is used for connection is used as an example in FIG. 4.

By invoking an operation instruction stored in the memory 404, the processor 403 is configured to perform the following steps:

receiving a full data updating instruction;

acquiring to-be-imported data according to the full data updating instruction, and generating a full data updating file according to the to-be-imported data, where the full data updating file includes P rows of new data, each row of new data includes one row key and Q new column qualifiers, a data type of each new column qualifier is a put type, and an update timestamp is set for each new column qualifier;

acquiring M rows of old data in a data table corresponding to the full data updating instruction, where each row of old data includes one row key and N old column qualifiers, and an original timestamp is set for each old column qualifier;

generating a full data deleting file according to the M rows of old data, where the full data deleting file includes M rows of delete data; each row of delete data is in a one-to-one correspondence with each row of old data; a data type of each row of delete data is a Delete type; a delete timestamp is set for each row of delete data; a delete timestamp of an $R^{th}$ row of delete data is greater than a maximum value of an original timestamp of the $R^{th}$ row of old data; the delete timestamp of the $R^{th}$ row of delete data is less than a minimum value of an update timestamp of an $S^{th}$ row of new data; and the $R^{th}$ row of delete data, the $R^{th}$ row of old data, and the $S^{th}$ row of new data have a same RowKey, $1 \leq R \leq M$, and $1 \leq S \leq P$;

importing the full data updating file into the data table; and importing the full data deleting file into the data table.

In some embodiments of the present invention, the processor 403 first generates the full data deleting file, and then generates the full data updating file; and sets a moment at which the full data updating file is generated as the update timestamp of each new column qualifier, and sets a moment at which the full data deleting file is generated as the delete timestamp of each row of delete data.

In some embodiments of the present invention, the processor 403 first imports the full data updating file into the data table, and then imports the full data deleting file into the data table. In some embodiments of the present invention, the processor 403 is further configured to perform the following step:

changing a save path of the full data updating file to a directory of the data table corresponding to the full data updating instruction.

In some embodiments of the present invention, the processor 403 is further configured to perform the following step:

changing a save path of the full data deleting file to a directory of the data table corresponding to the full data updating instruction.

Figure 5:
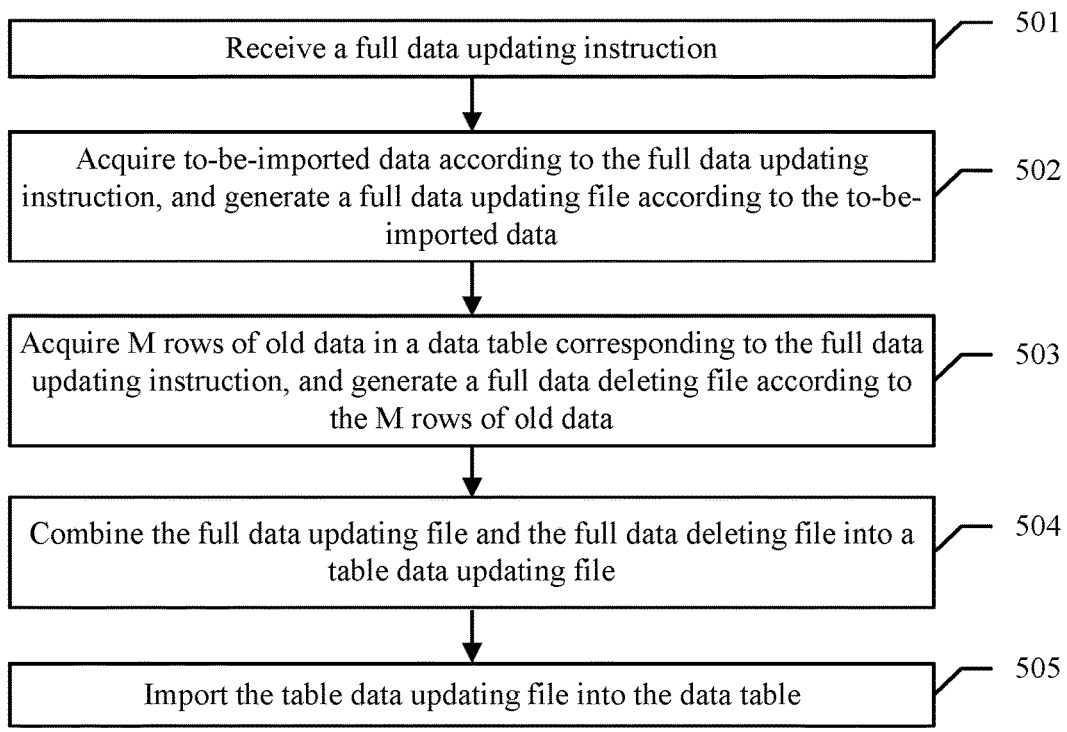
FIG. 5 is a flowchart of a method for updating a data table of a KeyValue database according to another embodiment of the present invention.

Referring to FIG. 5, an embodiment of the present invention further provides another method for updating a data table of a KeyValue database, which specifically includes:

501. Receive a full data updating instruction.

502. Acquire to-be-imported data according to the full data updating instruction, and generate a full data updating file according to the to-be-imported data.

503. Acquire M rows of old data in a data table corresponding to the full data updating instruction, and generate a full data deleting file according to the M rows of old data.

Steps 501 to 503 are basically the same as steps 101 to 103, and details are not described herein.

504. Combine the full data updating file and the full data deleting file into a table data updating file.

After generating the full data updating file and the full data deleting file, an apparatus for updating table data combines the full data updating file and the full data deleting file into the table data updating file. The table data updating file that is obtained after the combination not only includes all data of the full data updating file but also includes all data of the full data deleting file.

505. Import the table data updating file into the data table.

The apparatus for updating table data imports the table data updating file into the data table corresponding to the full data updating instruction. Because the table data updating file is imported into the data table at a time, atomicity of data importing can be ensured.

The table data updating file that is obtained after the combination includes all the data of the full data updating file, and a minimum value of an update timestamp of an $S^{th}$ row of new data of the full data updating file is greater than a maximum value of an original timestamp of an $R^{th}$ row of old data that has a same RowKey as the $S^{th}$ row of new data; therefore, after the table data updating file is imported into the data table, if the $R^{th}$ row of old data exists, the $S^{th}$ row of new data can overwrite the $R^{th}$ row of old data, and a user can read the $S^{th}$ row of new data, but cannot read the $R^{th}$ row of old data.

The table data updating file that is obtained after the combination includes all the data of the full data deleting file, and a delete timestamp of the $R^{th}$ row of delete data is greater than the maximum value of the original timestamp of the $R^{th}$ row of old data that has a same RowKey as the $R^{th}$ row of delete data; therefore, after the table data updating file is imported into the data table, the $R^{th}$ row of delete data can delete the $R^{th}$ row of old data that has the same RowKey as the $R^{th}$ row of delete data. In addition, the full data deleting file includes the M rows of delete data that are in a one-to-one correspondence with RowKeys of the M rows of old data in the data table, and therefore, after the table data updating file is imported into the data table, all the M rows of old data in the data table are deleted, and the user cannot read the old data from the data table. The delete timestamp of the $R^{th}$ row of delete data is less than the minimum value of the update timestamp of the $S^{th}$ row of new data that has a same RowKey as the $R^{th}$ row of delete data, and therefore, if the $S^{th}$ row of new data exists, the $S^{th}$ row of new data is still valid, that is, all the data of the table data updating file can still be normally read by the user.

This embodiment provides the method for updating a data table of a KeyValue database, including: receiving a full data updating instruction; acquiring to-be-imported data according to the full data updating instruction, and generating a full data updating file according to the to-be-imported data; acquiring M rows of old data in a data table corresponding to the full data updating instruction; generating a full data deleting file according to the M rows of old data; combining the full data updating file and the full data deleting file into a table data updating file; and importing the table data updating file into the data table. By using such a method, full updating of all data in a data table of a KeyValue database is implemented. In addition, because a full data updating file and a full data deleting file are not imported into the KeyValue database piece by piece, compared with updating KeyValue data in a data table piece by piece in the prior art, according to the method provided in this embodiment, an updating speed is faster and atomicity is better.

A difference between the embodiment shown in FIG. 1 and this embodiment lies in that, the full data updating file and the full data deleting file are first combined into the table data updating file, and then the table data updating file is imported into the data table. In this way, the file needs to be imported into the data table only once to implement full updating of table data. More preferably, in another embodiment of the present invention, the apparatus for updating table data may not generate the full data updating file or the full data deleting file, but directly generate the table data updating file according to the full data update instruction, and then import the table data updating file into the data table.

Preferably, the apparatus for updating table data may change a save path of the table data updating file to a directory of the data table, so as to implement importing of the table data updating file into the data table. An operation of changing the save path takes only seconds.

Figure 6:
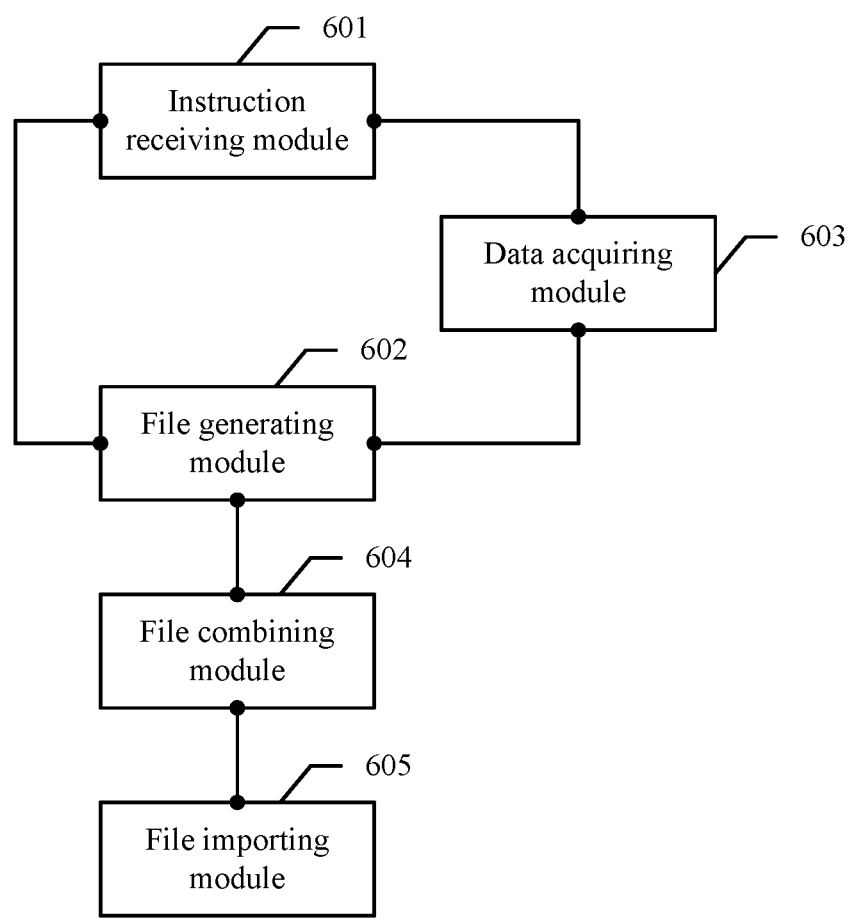
FIG. 6 is a structural diagram of an apparatus for updating table data according to another embodiment of the present invention.

An embodiment of the present invention further provides a related apparatus for updating table data. Referring to FIG. 6, a basic structure of the apparatus mainly includes:

An instruction receiving module 601 is configured to receive a full data updating instruction;

A file generating module 602 is configured to: acquire to-be-imported data according to the full data updating instruction, and generate a full data updating file according to the to-be-imported data;

A data acquiring module 603 is configured to acquire M rows of old data in a data table corresponding to the full data updating instruction;

The file generating module 602 is further configured to generate a full data deleting file according to the M rows of old data;

The modules 601 to 603 are basically the same as the modules 301 to 303, and details are not described herein.

A file combining module 604 is configured to combine the full data updating file and the full data deleting file into a table data updating file.

After the apparatus for updating table data generates the full data updating file and the full data deleting file, the file combining module 604 combines the full data updating file and the full data deleting file into the table data updating file.

The table data updating file that is obtained after the combination not only includes all data of the full data updating file but also includes all data of the full data deleting file.

A file importing module 605 is configured to import the table data updating file into the data table.

The file importing module 605 imports the table data updating file into the data table corresponding to the full data updating instruction. Because the table data updating file is imported into the data table at a time, atomicity of data importing can be ensured.

The table data updating file that is obtained after the combination includes all the data of the full data updating file, and a minimum value of an update timestamp of an $S^{th}$ row of new data of the full data updating file is greater than a maximum value of an original timestamp of an $R^{th}$ row of old data that has a same RowKey as the $S^{th}$ row of new data; therefore, after the table data updating file is imported into the data table, if the $R^{th}$ row of old data exists, the $S^{th}$ row of new data can overwrite the $R^{th}$ row of old data, and a user can read the $S^{th}$ row of new data, but cannot read the $R^{th}$ row of old data.

The table data updating file that is obtained after the combination includes all the data of the full data deleting file, and a delete timestamp of the $R^{th}$ row of delete data is greater than the maximum value of the original timestamp of the $R^{th}$ row of old data that has a same RowKey as the $R^{th}$ row of delete data; therefore, after the table data updating file is imported into the data table, the $R^{th}$ row of delete data can delete the $R^{th}$ row of old data that has the same RowKey as the $R^{th}$ row of delete data. In addition, the full data deleting file includes the M rows of delete data that are in a one-to-one correspondence with RowKeys of the M rows of old data in the data table, and therefore, after the table data updating file is imported into the data table, all the M rows of old data in the data table are deleted, and the user cannot read the old data from the data table. The delete timestamp of the $R^{th}$ row of delete data is less than the minimum value of the update timestamp of the $S^{th}$ row of new data that has a same RowKey as the $R^{th}$ row of delete data, and therefore, if the $S^{th}$ row of new data exists, the $S^{th}$ row of new data is still valid, that is, all the data of the table data updating file can still be normally read by the user.

This embodiment provides the apparatus for updating table data, where an instruction receiving module 601 receives a full data updating instruction; a file generating module 602 acquires to-be-imported data according to the full data updating instruction and generates a full data updating file according to the to-be-imported data; a data acquiring module 603 acquires M rows of old data in a data table corresponding to the full data updating instruction; where the file generating module 602 generates a full data deleting file according to the M rows of old data; a file combining module 604 combines the full data updating file and the full data deleting file into a table data updating file; and a file importing module 605 imports the table data updating file into the data table. By using such a method, full updating of all data in a data table of a KeyValue database is implemented. In addition, because a full data updating file and a full data deleting file are not imported into the KeyValue database piece by piece, compared with updating KeyValue data in a data table piece by piece in the prior art, according to the method provided in this embodiment, an updating speed is faster and atomicity is better.

Preferably, the file importing module 605 may change a save path of the table data updating file to a directory of the data table, so as to implement importing of the table data updating file into the data table. An operation of changing the save path takes only seconds.

A difference between the embodiment shown in FIG. 1 and this embodiment lies in that, the full data updating file and the full data deleting file are first combined into the table data updating file, and then the table data updating file is imported into the data table. In this way, the file needs to be imported into the data table only once to implement full updating of table data. More preferably, in another embodiment of the present invention, the file generating module 602 may not generate the full data updating file or the full data deleting file, but directly generate the table data updating file according to the full data update instruction; then, the file importing module 605 imports the table data updating file into the data table.

The foregoing describes an apparatus for updating table data in the embodiments of the present invention from a perspective of unitization of a functional entity; and the following describes the apparatus for updating table data in the embodiments of the present invention from a perspective of hardware processing. Still referring to FIG. 4, another embodiment of an apparatus 400 for updating table data in the embodiments of the present invention includes:

an input apparatus 401, an output apparatus 402, a processor 403, and a memory 404 (there may be one or more processors 403 in the apparatus 400 for updating table data, and that there is one processor 403 is used as an example in FIG. 4). In some embodiments of the present invention, the input apparatus 401, the output apparatus 402, the processor 403, and the memory 404 may be connected by using a bus or in another manner. That a bus is used for connection is used as an example in FIG. 4.

By invoking an operation instruction stored in the memory 404, the processor 403 is configured to perform the following steps:

receiving a full data updating instruction;

acquiring to-be-imported data according to the full data updating instruction, and generating a full data updating file according to the to-be-imported data, where the full data updating file includes P rows of new data, each row of new data includes one row key and Q new column qualifiers, a data type of each new column qualifier is a put type, and an update timestamp is set for each new column qualifier;

acquiring M rows of old data in a data table corresponding to the full data updating instruction, where each row of old data includes one row key and N old column qualifiers, and an original timestamp is set for each old column qualifier;

generating a full data deleting file according to the M rows of old data, where the full data deleting file includes M rows of delete data; each row of delete data is in a one-to-one correspondence with each row of old data; a data type of each row of delete data is a Delete type; a delete timestamp is set for each row of delete data; a delete timestamp of an $R^{th}$ row of delete data is greater than a maximum value of an original timestamp of the $R^{th}$ row of old data; the delete timestamp of the $R^{th}$ row of delete data is less than a minimum value of an update timestamp of an $S^{th}$ row of new data; and the $R^{th}$ row of delete data, the $R^{th}$ row of old data, and the $S^{th}$ row of new data have a same RowKey, $1 \leq R \leq M$, and $1 \leq S \leq P$;

combining the full data updating file and the full data deleting file into a table data updating file; and importing the table data updating file into the data table.

In some embodiments of the present invention, the processor 403 is further configured to perform the following step:

changing a save path of the table data updating file to a directory of the data table corresponding to the full data updating instruction.

It may be clearly understood by a person skilled in the art that, for the purpose of convenient and brief description, for a detailed working process of the foregoing system, module, and unit, reference may be made to a corresponding process in the foregoing method embodiments, and details are not described herein.

In the several embodiments provided in the present application, it should be understood that the disclosed system and method may be implemented in other manners. For example, the described system embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

What is claimed is:

1. A method for updating a data table in a KeyValue database, comprising:
    receiving raw data for updating the data table;
    formatting the raw data into a data updating file, wherein the data updating file comprises P rows of data, each row comprises one row key and Q column qualifiers, and an update timestamp is set for each column qualifier in each row, wherein P is greater than or equal to 1, and Q is greater than or equal to 1;
    generating a data deleting file, wherein the data deleting file comprises M rows, each row of the data deleting file corresponds to one row of existing data in the data table, wherein each row of existing data in the data table comprises one row key and N column qualifiers, each column qualifier has an original timestamp, and wherein each row of the data deleting file comprises a row key that is the same as the row key of the corresponding row of existing data in the data table, and a delete timestamp is set for each row of the data deleting file, wherein M is greater than or equal to 1, and N is greater than or equal to 1;
    importing the data updating file into the data table; and
    importing the data deleting file into the data table;
    wherein a delete timestamp of an $R^{th}$ row of the data deleting file is greater than a maximum value of original timestamps of the column qualifiers in the row of existing data in the data table corresponding to the $R^{th}$ row of the data deleting file;
    wherein the delete timestamp of the $R^{th}$ row of the data deleting file is less than a minimum value of update timestamps of the column qualifiers in an $S^{th}$ row of the data updating file; and
    wherein the $R^{th}$ row of the data deleting file and the $S^{th}$ row of the data updating file have a same row key, $1 \leq R \leq M$, and $1 \leq S \leq P$.

2. The method according to claim 1, wherein the step of generating the data deleting file is performed before the step of formatting the raw data into the data updating file; and
    wherein an update timestamp set for each column qualifier in the data updating file is a moment at which the data updating file is generated, and a delete timestamp set for each row of the data deleting file is a moment at which the data deleting file is generated.

3. The method according to claim 1, wherein the step of importing the data updating file into the data table is performed before the step of importing the data deleting file into the data table.

4. The method according to claim 1, wherein importing the data updating file into the data table comprises:
    changing a save path of the data updating file to a directory of the data table.

5. The method-according to claim 1, wherein importing the data deleting file into the data table comprises:
    changing a save path of the data deleting file to a directory of the data table.

6. The method-according to claim 1, wherein the steps of importing the data updating file into the data table and importing the data deleting file into the data table comprise:
    combining the data updating file and the data deleting file into a table data updating file; and
    importing the table data updating file into the data table.

7. The method according to claim 6, wherein the importing the table data updating file into the data table comprises:
    changing a save path of the table data updating file to a directory of the data table.

8. An apparatus comprising a processor and a memory storing instructions for execution by the processor, wherein the instructions, when executed by the processor, cause the apparatus to:
    obtain raw data for updating a data table in a KeyValue database;
    format the raw data into a data updating file, wherein the data updating file comprises P rows of data, each row comprises one row key and Q column qualifiers, and an update timestamp is set for each column qualifier in each row, wherein P is greater than or equal to 1, and Q is equal to or greater than 1;
    generate a data deleting file, wherein the data deleting file comprises M rows, each row of the data deleting file corresponds to one row of existing data in the data table, the row of existing data in the data table comprises one row key and N column qualifiers, each column qualifier has an original timestamp, and wherein each row of the data deleting file comprises a row key that is the same as the row key of the corresponding row of data in the data table, and a delete timestamp is set for each row of the data deleting file, wherein M is greater than or equal to 1, and N is equal to or greater than 1;

import the data updating file into the data table; and import the data deleting file into the data table;

wherein a delete timestamp of an $R^{th}$ row of the data deleting file is greater than a maximum value of original timestamps of the row of data in the data table corresponding to the $R^{th}$ row;

wherein the delete timestamp of the $R^{th}$ row of the data deleting file is less than a minimum value of the update timestamps of an $S^{th}$ row of the data updating file; and wherein the $R^{th}$ row of the data deleting file and the $S^{th}$ row of the data updating file have a same row key, $1 \leq R \leq M$, and $1 \leq S \leq P$.

9. The apparatus according to claim 8, wherein the instructions cause the apparatus to generate the data deleting file, and then format the raw data into the data updating file;

wherein an update timestamp set for each column qualifier in the data updating file is a moment at which the data updating file is generated, and a delete timestamp set for each row of the data deleting file is a moment at which the data deleting file is generated.

10. The apparatus according to claim 8, wherein the instructions cause the apparatus to:

import the data updating file into the data table, and then import the data deleting file into the data table.

11. The apparatus according to claim 8, wherein in importing the data updating file into the data table, the instructions cause the apparatus to:

change a save path of the data updating file to a directory of the data table.

12. The apparatus according to claim 8, wherein in importing the data deleting file into the data table, the instructions cause the apparatus to:

change a save path of the data deleting file to a directory of the data table.

13. The apparatus according to claim 8, wherein in importing the data updating file into the data table and importing the data deleting file into the data table, the instructions cause the apparatus to:

combine the data updating file and the data deleting file into a table data updating file; and import the table data updating file into the data table.

14. The apparatus according to claim 13, wherein in importing to import the table data updating file into the data table, the instructions cause the apparatus to:

change a save path of the table data updating file to a directory of the data table.

* * * * *